United States Patent
Tang (10) Patent No.: US 10,233,898 B1
(45) Date of Patent: Mar. 19, 2019

(54) TOILET WITH POWER GENERATION ASSEMBLY

(71) Applicant: Yi-Wen Tang, Taichung (TW)

(72) Inventor: Yi-Wen Tang, Taichung (TW)

( * ) Notice: Subject to any disclaimer, the term of this patent is extended or adjusted under 35 U.S.C. 154(b) by 0 days.

(21) Appl. No.: 15/822,113

(22) Filed: Nov. 24, 2017

(51) Int. Cl.
    *A47K 17/00*     (2006.01)
    *F03B 17/06*     (2006.01)
    *E03D 1/34*     (2006.01)
    *E03D 5/10*     (2006.01)

(52) U.S. Cl.
    CPC .............. *F03B 17/062* (2013.01); *E03D 1/34* (2013.01); *E03D 5/10* (2013.01); *F05B 2220/32* (2013.01); *F05B 2220/706* (2013.01); *F05B 2240/12* (2013.01); *F05B 2240/911* (2013.01)

(58) Field of Classification Search
    CPC . F03B 17/062; E03D 1/34; E03D 5/10; F05B 2220/32; F05B 2220/706
    USPC ...................................................... 4/353, 661
    See application file for complete search history.

(56) References Cited

U.S. PATENT DOCUMENTS

| | | | | |
|---|---|---|---|---|
| 6,061,843 | A  * | 5/2000 | Rump | E03C 1/057 |
| | | | | 4/302 |
| 2003/0041370 | A1* | 3/2003 | Chung | E03D 3/00 |
| | | | | 4/300 |
| 2012/0318386 | A1* | 12/2012 | Guzman | E03C 1/057 |
| | | | | 137/560 |
| 2018/0062481 | A1* | 3/2018 | Alexander | H02K 7/1823 |

* cited by examiner

Primary Examiner — Huyen Le (57) ABSTRACT

A toilet includes a power generation assembly connected thereto which is activated when flushing the toilet so as to generate electric power. The power generation assembly includes a body with a rotary unit and a power generation unit received therein. The power generation unit includes multiple magnets and coil units which. When flushing, the rotary unit is rotated by water and the magnets are rotated relative to the coil units. The coil units generate electric current to provide the necessary electric power of the toilet.

9 Claims, 10 Drawing Sheets

TOILET WITH POWER GENERATION ASSEMBLY

BACKGROUND OF THE INVENTION

1. Fields of the invention

The present invention relates to a toilet, and more particularly, to a toilet with a power generation assembly which is activated when the users flush the toilet.

2. Descriptions of Related Art

Figure 11:
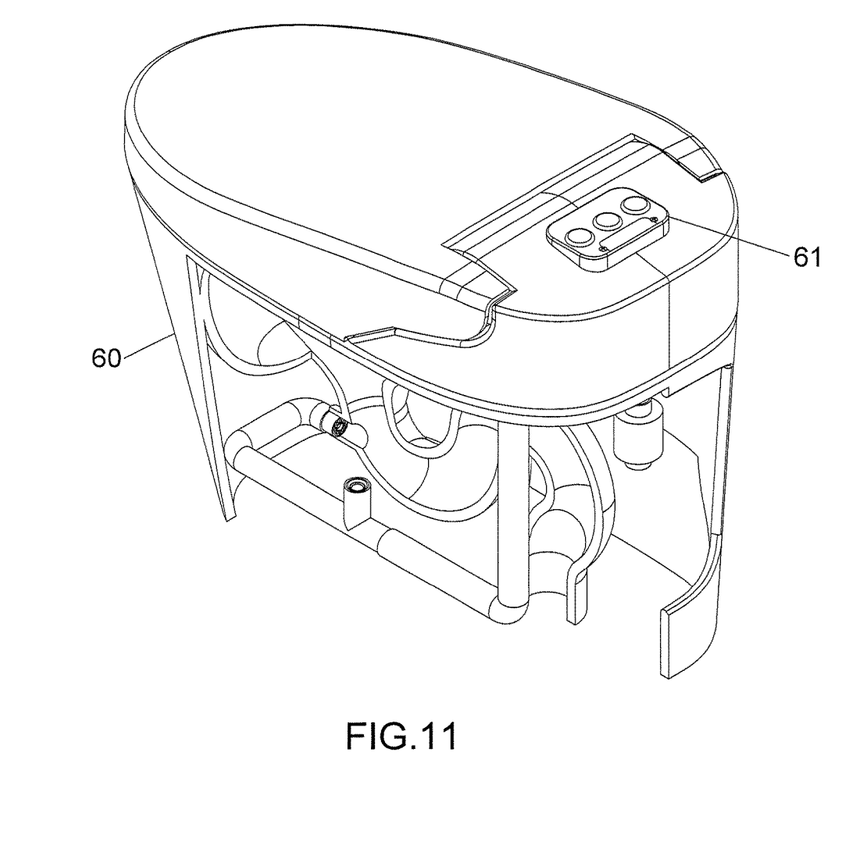
FIG. 11 shows a conventional toilet.

The conventional toilet 60, such as the toilet disclosed in U.S. Pat. No. 9,714,506, is disclosed in FIG. 11 and comprises multiple pipes, an electro-magnetic valve and a control unit 61. The users operate the control unit 61 to control the electro-magnetic valve to flush. The control unit 61 includes a power storage unit, a battery and some necessary parts. The battery provides power to the control unit 61 and the electro-magnetic valve, and the control unit 61 is connected with the battery by wires so as to charge the battery. However, due to humidity in the bathrooms, the wires easily get rust and may cause problems when electric power is applied through the wires. On the contrary, if the battery is not a re-chargeable battery, the battery needs to be replaced frequently.

The present invention intends to provide a toilet with a power generation assembly wherein the power storage unit and the coil unit are not affected by moisture and water.

SUMMARY OF THE INVENTION

The present invention relates to a toilet which comprises a power generation assembly having a body, a rotary unit and a power generation unit. The body includes a room defined therein. An inlet and an outlet are respectively located on two ends of the body and communicate with the room. The inlet is connected with a water source for introducing water to flow through the room and the outlet. A pipe is connected to the outlet and the toilet. Two pivotal portion are respectively located on two opposite inside walls of the room. The rotary unit is rotatably received in the room and includes a shaft, a blade unit, a frame and multiple magnets. The shaft securely extends through a first passage of the blade unit and a second passage of the frame. Two ends of the shaft respectively protrude beyond the first and second passage and are respectively and pivotably connected to the two pivotal portions. The blade unit includes multiple blades extending radially therefrom which are located in the room and between the inlet and the outlet. The frame includes multiple cups and each cup has a recess. The magnets are respectively accommodated in the recesses.

The power generation unit is connected to the body and comprises a tubular part, a power storage unit, multiple coil units and a cover. The tubular part is mounted to outside of the body and has a chamber defined therein. The chamber is not in communication with the room. An upper portion of the body is received in the chamber. The power storage unit is a ring-shaped unit which is located in the chamber. The upper portion of the body is located at the center of the power storage unit. The coil units are located in a ring-shaped arrangement, and the magnets are located inside the ring-shaped arrangement of the coil units. The coil units electrically connected to the power storage unit.

When the magnets are rotated relative to the coil units, the coil units generate electric current. The cover is mounted to the open top of the tubular part to seal the chamber. When the blades are hit by water to rotate the blade unit, the blade unit rotates the frame so that the magnets are rotated relative to the coil units, and the coil units generate electric current which is collected by the power storage unit.

The toilet does not need any wire to be connected with an electric power source to get the electric power. Each flushing generates electric power which is stored by the power storage unit. The room of the body and the chamber of the power generation unit are not in communication with each other so that the coil units are isolated from water to avoid from electric circuit short.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 9, the toilet 50 of the present invention comprises a power generation assembly 1 having a body 10, a rotary unit 20 and a power generation unit 30. The body 10 is composed of a first half 100 and a second half 101 which is connected to the first half 100 so as to define a room 11 therein. Proper sealing members are located between the first and second halves 100, 101. An inlet 12 and an outlet 13 are respectively located on two ends of the body 10 and communicate with the room 11. The inlet 12 is connected with a water source for introducing water to flow through the room 11 and the outlet 13. A pipe 40 is connected to the outlet 13 and the toilet 50. Two pivotal portion 14 are respectively located on two opposite inside walls of the room 11.

The rotary unit 20 is rotatably received in the room 11 and includes a shaft 21, a blade unit 22, a frame 23 and multiple magnets 24. The shaft 21 securely extends through a first passage 221 of the blade unit 22 and a second passage 233 of the frame 23. Two ends of the shaft 21 respectively protrude beyond the first and second passage 221, 233 and are respectively and pivotably connected to the two pivotal portions 14. The shaft 21 includes a groove 212 defined in one of two ends thereof, and a clip 25 is engaged with the groove 212 to restrict the blade unit 22 and the frame 23 from separating from the shaft 21. The blade unit 22 includes multiple blades 220 extending radially therefrom which are located in the room 11 and between the inlet 12 and the outlet 13. The frame 23 includes multiple cups 231 and each cup 231 has a recess 232. The magnets 24 are respectively accommodated in the recesses 232.

The power generation unit 30 is connected to the body 10 and comprises a tubular part 31, a power storage unit 320, a power collection unit 32, multiple coil units 33 and a cover 34. The tubular part 31 is mounted to outside of the body 10 and has a chamber 311 defined therein. The chamber 311 is not in communication with the room 11. The lateral side of the tubular part 31 includes a hole 312 which communicates with the chamber 311. The tubular part 31 includes a hole 312 which communicates with the chamber 311. An upper portion 102 of the body 10 is inserted from a lower end of the chamber 311 and is received in the chamber 311. The chamber 311 includes a flange 313 extends inward from the inner periphery of the lower end thereof. The power collection unit 32 is a ring-shaped unit which is located on the flange 313 in the chamber 311. The upper portion 102 of the body 10 is located at the center of the power collection unit 32. The coil units 33 are located in a ring-shaped arrangement and are circularly distributed on the power collection unit 32, and the magnets 24 are located inside the ring-shaped arrangement of the coil units 33. The coil units 33 are electrically connected to the power collection unit 32, and the power collection unit 32 is electrically connected to the power storage unit 320 for storing the electric power for the power collection unit 32.

When the magnets 24 are rotated relative to the coil units 33, the coil units 33 generate electric current. The cover 34 is mounted to the open top of the tubular part 31 to seal the top end of the chamber 311. When the blades 22 are hit by water to rotate the blade unit 22, the blade unit 22 rotates the frame 23 so that the magnets 24 are rotated relative to the coil units 33, and the coil units 33 generate electric current which is collected by the power collection unit 32. The electric power provides necessary electric power to allow the toilet 50 to function normally. The room 11 of the body 10 and the chamber 311 of the power generation unit 30 are not in communication with each other so that the coil units 33 are isolated from water to avoid from electric circuit short.

Figure 9:
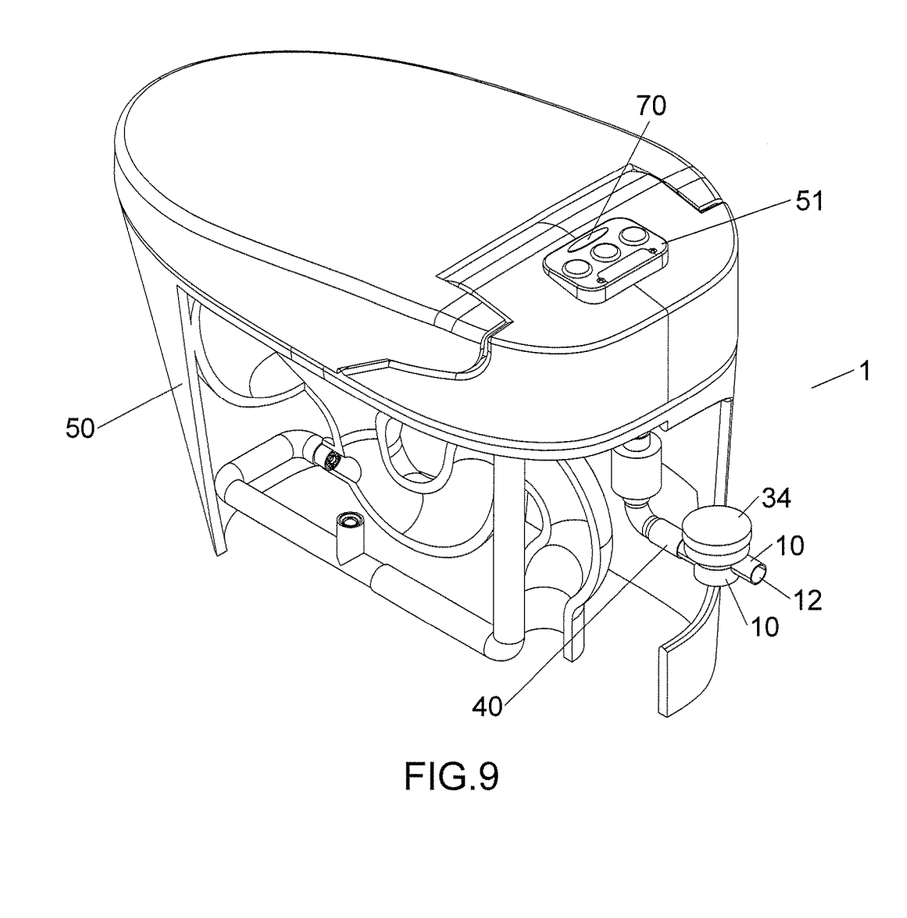
FIG. 9 is a perspective view to show the toilet of the present invention.

As shown in FIG. 9, the power generation assembly 1 is connected to the toilet 50, and the toilet 50 includes the pipe 40 that is connected between the outlet 13 of the body 10 and another pipe connected to the toilet 50. When flushing, the power generation assembly 1 generates electric power which provides necessary electric power for the toilet 50. A control unit 51 is connected the toilet 50 and includes multiple buttons so that the users press the button to introduce water from the inlet 12, and flows through the room 11, the outlet 13 and the pipe 40 to flush the toilet 50. The control unit 51 includes a box, and a signal processing unit, battery and other necessary parts received in the box. The power storage unit 320 is electrically connected with the control unit 51 to provide necessary electric powers for the control unit 51.

Figure 10:
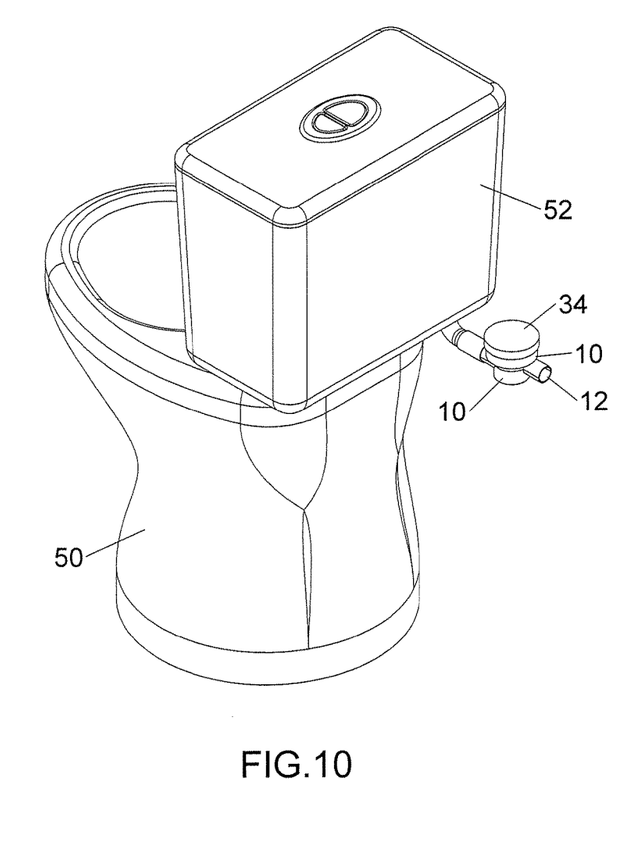
FIG. 10 shows the second embodiment of the toilet of the present invention.

FIG. 10 shows that a water tank 52 is connected to the toilet 50, and the power generation assembly 1 is connected to the toilet 50 to generate electric power when flushing.

Another embodiment shows that at least one electronic device, such as a lighting device, a mirror with electric, a voice-control demister or a control unit 51, is connected to the toilet 50 (referring to FIG. 9). The control unit 51 is powered by the power storage unit 320 to control at least one electro-magnetic valve to be activated, so that at least one outlet pipe of the toilet is in an open-status to flush a specific amount of water.

The groove 212 of the shaft 21 can be replaced by threads, and the clip 25 can be a fastening member which is connected to the threads to restrict the blade unit 22 and the flame 23.

The advantages of the present invention are that the power generation assembly 1 is connected to the toilet 50. When flushing, the water flows into the room 11 via the inlet 12 to rotate the blade unit 22, so that the frame 23 is rotated with the blade unit 22, and the magnets 24 rotate relative to the coil units 33 which generate electric power which is collected by the power collection unit 32 and stored by the power storage unit 320. The electric power provides necessary electric power for the toilet 50. Therefore, the toilet 50 does not need any wire to be connected with the external power source.

Figure 1:
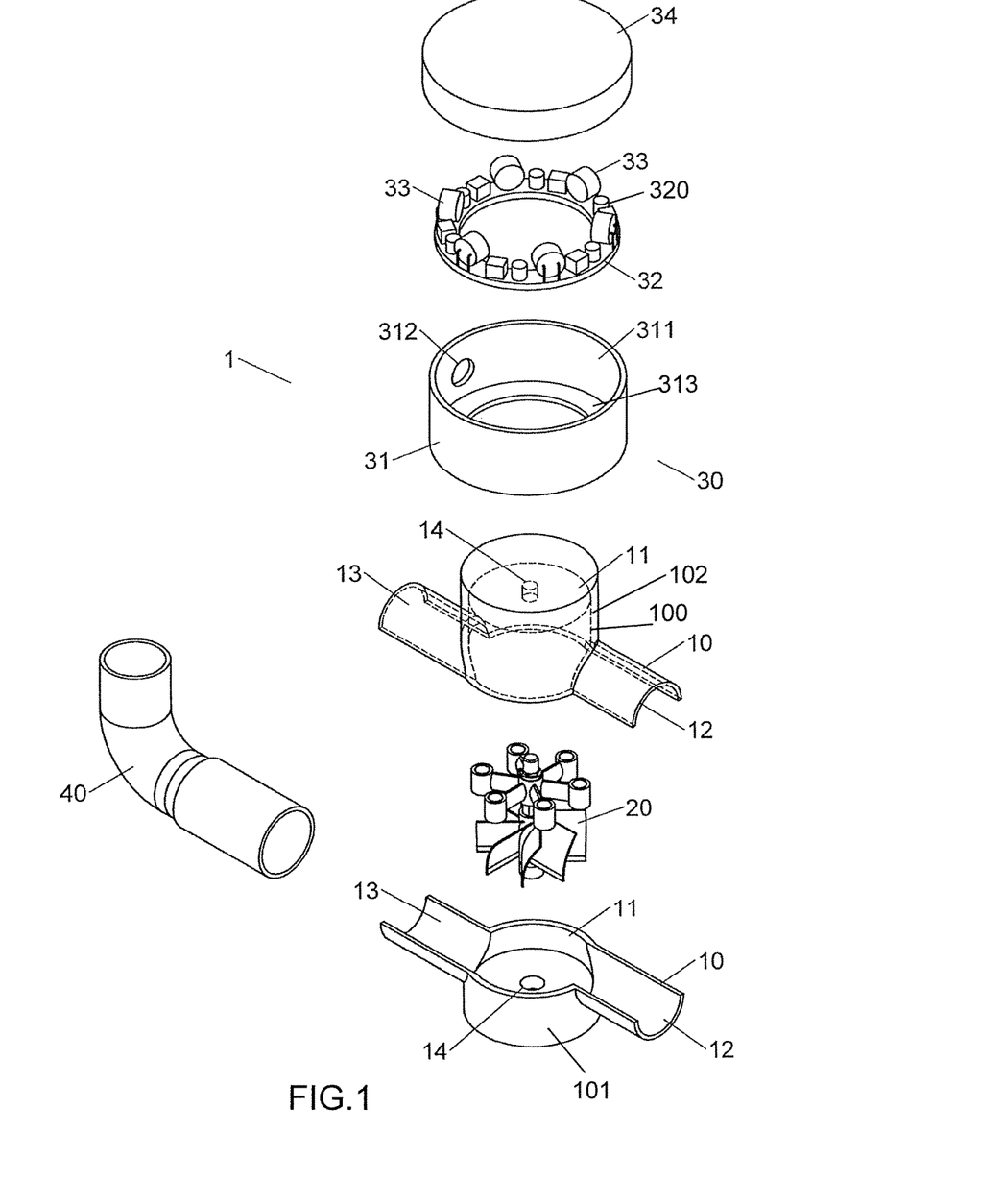
FIG. 1 is an exploded view of the power generation assembly of the toilet of the present invention.
Figure 2:
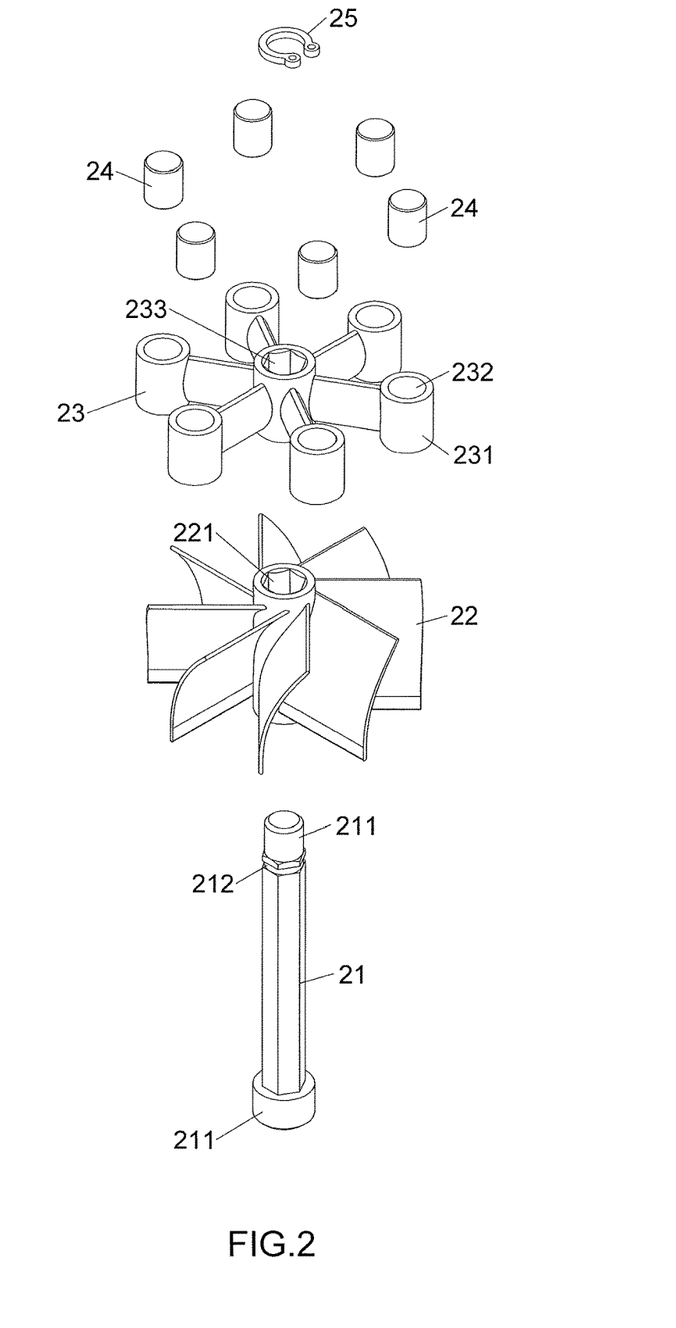
FIG. 2 is an exploded view of the rotary unit of the toilet of the present invention.
Figure 3:
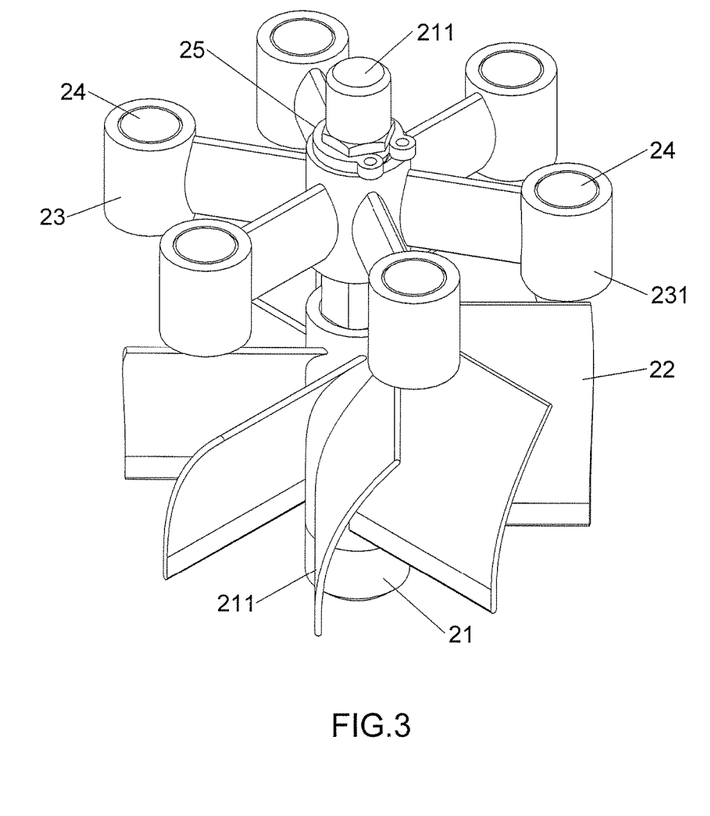
FIG. 3 is a perspective view of the rotary unit of the toilet of the present invention.
Figure 4:
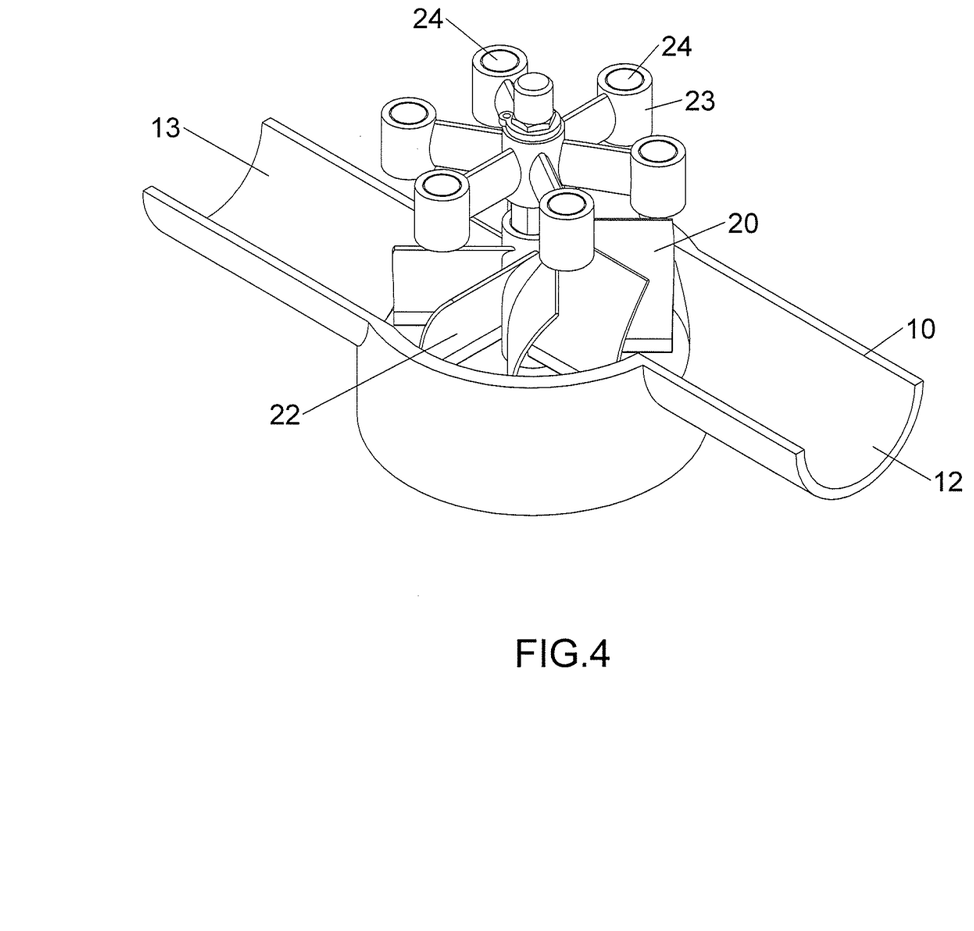
FIG. 4 shows that the rotary unit is accommodate in the second half of the body of the power generation assembly of the toilet of the present invention.
Figure 5:
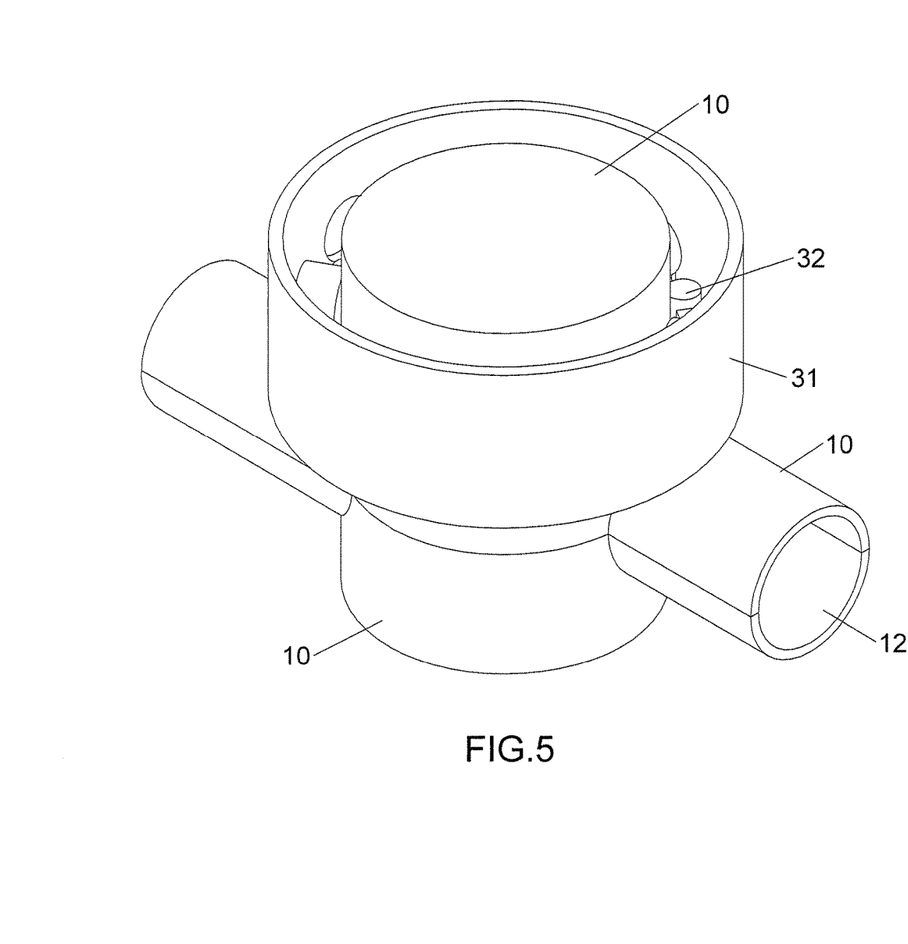
FIG. 5 shows that the body and the power generation unit are accommodated in the tubular part of the power generation assembly of the toilet of the present invention.
Figure 6:
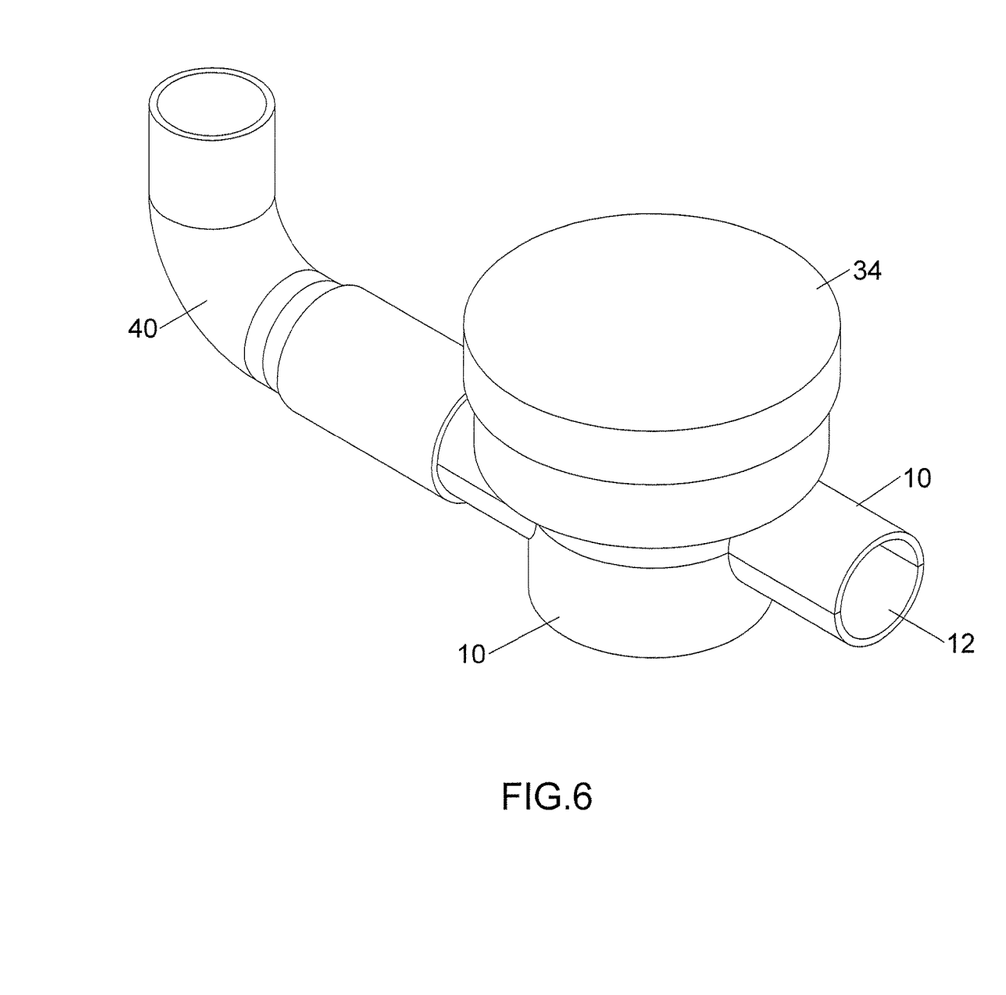
FIG. 6 shows the pipe is connected to the outlet of the body of the power generation assembly of the toilet of the present invention.
Figure 7:
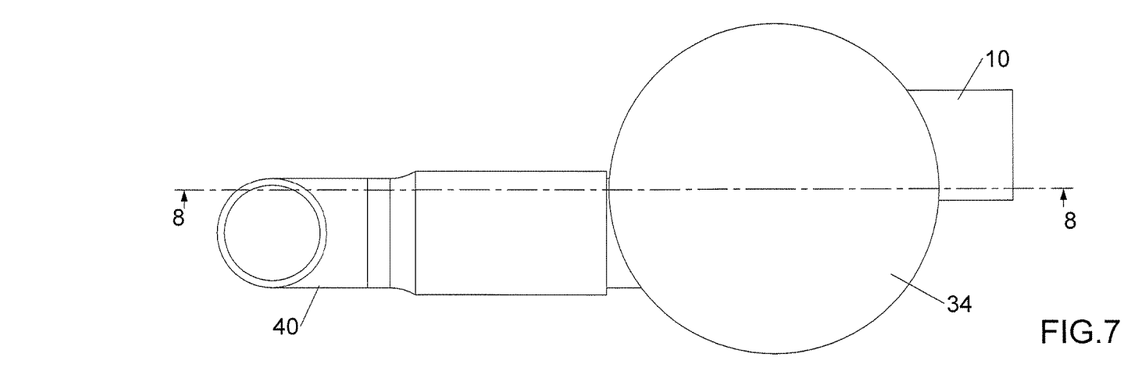
FIG. 7 is a top vie of the body of the power generation assembly of the toilet of the present invention.

As shown in FIG. 1, the magnets 24 are respectively accommodated in the recesses 232 of the cups 231. The magnets 24 are arranged in a ring-shaped arrangement. The coil units 33 are arranged in a ring-shaped arrangement and electrically connected to the power collection unit 32. When the magnets 24 rotate, the coil units 33 and the magnets 24 respectively induce current to generate more amount of electric power.

Figure 8:
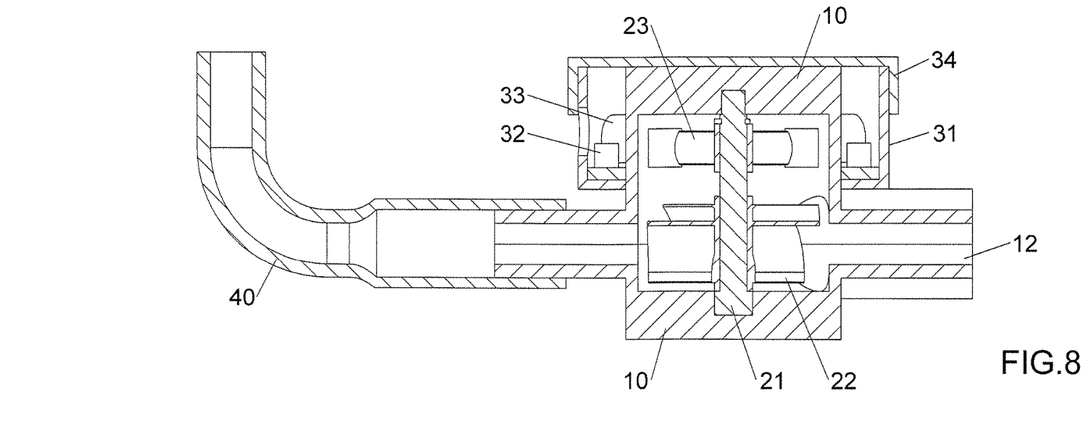
FIG. 8 is a cross sectional view, taken along line 8-8 in FIG. 7.

As shown in FIG. 8, the room 11 of the body 10 and the chamber 311 of the power generation unit 30 are not in communication with each other so that the coil units 33 are isolated from water to avoid from electric circuit short.

When the users press the button of the control unit 51 to flush, the power generation unit 30 generate power and provides tot eh control unit 51. The water rotates the blade unit 22 and the frame 23, and the magnets 24 rotate relative to the coil units 33 which generate electric power which is collected by the power collection unit 32 and is stored by the power storage unit 320. The electric power provides the control unit 51.

Referring to FIG. 9, the toilet 50 may be cooperated with different electronic devices 70, such as a lighting device, a mirror with electric or voice-control demister, and these electronic devices 70 are powered by the power generation assembly 1.

While we have shown and described the embodiment in accordance with the present invention, it should be clear to those skilled in the art that further embodiments may be made without departing from the scope of the present invention.

What is claimed is:

1. A toilet comprising:

a power generation assembly having a body, a rotary unit and a power generation unit, the body having a room defined therein, an inlet and an outlet respectively located on two ends of the body and communicating with the room, the inlet adapted to be connected with a water source for introducing water to flow through the room and the outlet, a pipe connected to the outlet and the toilet, two pivotal portion respectively located on two opposite inside walls of the room;

the rotary unit rotatably received in the room and having a shaft, a blade unit, a frame and multiple magnets, the shaft securely extending through a first passage of the blade unit and a second passage of the frame, two ends of the shaft respectively protruding beyond the first and second passage and being respectively and pivotably connected to the two pivotal portions, the blade unit having multiple blades extending radially therefrom which are located in the room and between the inlet and the outlet, the frame having multiple cups and each cup having a recess, the magnets respectively accommodated in the recesses, and the power generation unit connected to the body and comprising a tubular part, a power collection unit, multiple coil units and a cover, the tubular part mounted to outside of the body and having a chamber defined therein, the chamber being not in communication with the room, an upper portion of the body received in the chamber, the power collection unit being a ring-shaped unit which is located in the chamber, the upper portion of the body located at a center of the power collection unit, the coil units located in a ring-shaped arrangement, and the magnets being located inside the ring-shaped arrangement of the coil units, the coil units electrically connected to the power collection unit, when the magnets are rotated relative to the coil units, the coil units generate electric current, the cover mounted to an open top of the tubular part to seal the chamber, when the blades being hit by water to rotate the blade unit, the blade unit rotates the frame so that the magnets are rotated relative to the coil units, the coil units generate electric current which is collected by the power collection unit and is stored in a power storage unit.

2. The toilet as claimed in claim 1, wherein the body is composed of a first half and a second half which is connected to the first half.

3. The toilet as claimed in claim 1, wherein the shaft includes a groove defined in one of two ends thereof, a clip is engaged with the groove to restrict the blade unit and the frame from separating from the shaft.

4. The toilet as claimed in claim 1, wherein a lateral side of the tubular part includes a hole which communicates with the chamber.

5. The toilet as claimed in claim 1, wherein a water tank is connected to the toilet.

6. The toilet as claimed in claim 1, wherein at least one electronic device is connected to the toilet and is powered by the power storage unit.

7. The toilet as claimed in claim 6, wherein the at least one electronic device is a control unit for controlling at least one electro-magnetic valve to be activated, so that at least one outlet pipe of the toilet is in an open-status to flush a specific amount of water.

8. The toilet as claimed in claim 1, wherein at least one electronic device is located at a distance from the toilet and is powered by the power storage unit.

9. The toilet as claimed in claim 1, wherein the upper portion of the body is inserted from a lower end of the chamber, the chamber includes a flange extends inward from an inner periphery of the lower end thereof, the power storage unit is located on the flange.

* * * * *